United States Patent [19]
Kim et al.

[11] Patent Number: 5,748,603
[45] Date of Patent: May 5, 1998

[54] OPTICAL PICKUP APPARATUS FOR DIFFERENT DISCS

[75] Inventors: Jin Yong Kim, Kyungki-Do; Seong Yun Jeong, Seoul, both of Rep. of Korea

[73] Assignee: LG Electronics, Inc., Seoul, Rep. of Korea

[21] Appl. No.: 775,453

[22] Filed: Dec. 30, 1996

[30] Foreign Application Priority Data

Dec. 30, 1995 [KR] Rep. of Korea ............. 68685/1995
Aug. 17, 1996 [KR] Rep. of Korea ............. 34042/1996

[51] Int. Cl.$^6$ ................................................. G11B 7/00
[52] U.S. Cl. ................................. 369/112; 369/110
[58] Field of Search ........................... 369/112, 110, 369/109, 44.23, 44.24, 120, 103, 58; 349/141, 142

[56] References Cited

U.S. PATENT DOCUMENTS

| | | | |
|---|---|---|---|
| 4,527,863 | 7/1985 | Glasper et al. | 369/142 |
| 5,210,627 | 5/1993 | Toide et al. | 369/110 |
| 5,416,757 | 5/1995 | Luecke et al. | 369/112 |
| 5,513,158 | 4/1996 | Ohsato | 369/112 |
| 5,539,718 | 7/1996 | Hoshi et al. | 369/100 |
| 5,594,713 | 1/1997 | Komma et al. | 369/112 |

Primary Examiner—Nabil Hindi

[57] ABSTRACT

An improved optical pickup apparatus for different discs which is capable of writing and reading a data onto discs having different writing densities and thicknesses by using one optical pickup apparatus and a liquid crystal deflector (LCD) or a Grating Polarizing Beam Splitter (GPBS). The apparatus includes an objective lens for focusing a beam onto optical discs each having different thicknesses, and a numerical aperture control means for selectively passing through a beam in accordance with the thickness of the optical discs, diffracting a portion of the beam, and controlling the numerical aperture of the objective lens.

18 Claims, 16 Drawing Sheets

10μm    12μm

RUBBING DIRECTION

GPBS

OPTICAL PICKUP APPARATUS FOR DIFFERENT DISCS

BACKGROUND OF THE INVENTION

1. Field of the Invention

The present invention relates to an optical pickup apparatus for different discs, and in particular to an improved optical pickup apparatus for different discs which is capable of writing and reading data to and from discs having different writing densities and thicknesses by using one optical pickup apparatus and a Liquid Crystal Deflector (LCD) or a Grating Polarizing Beam Splitter (GPBS).

2. Description of the Conventional Art

FIG. 1 is a view illustrating the construction of a conventional optical pickup apparatus.

As shown therein, a grating 2 is disposed beside a laser diode 1, which irradiates laser beams, for generating a main beam and two sub-beams for a tracking servo with respect to the laser beam irradiated from the laser diode 1.

In addition, a collimator lens 3 is arranged beside the grating 2 for converting the beam from the grating 2 into a parallel beam.

An objective lens 4 is arranged beside the collimator lens 3, and the parallel beam from the collimator lens 3 is focused onto an optical disc "D".

In addition, a beam splitting prism 5 is arranged between the grating 2 and the collimator lens 3 for transmitting or reflecting the beam reflected in accordance with the data written on the optical disc "D" and the incident beam from the grating 2 at a predetermined ratio.

A sensor lens 6 is arranged below the beam splitting prism 5 for condensing the beam reflected by the beam splitting prism 5, and an optical detector 7 is arranged below the sensor lens 6 for detecting the data signal of the beam from the sensor lens 6.

In the conventional optical pickup apparatus, the beam from the laser diode 1 passes through the grating 2 and the beam splitting prism 5 and is converted into a parallel light by the collimator lens 3, and then is condensed by the objective lens 4. The thusly condensed light is reflected or diffracted in accordance with the data written on the surface of the optical disc "D".

The beam reflected from the surface of the optical disc "D" passes through the objective lens 4 and the collimator lens 3 and is reflected by the beam splitting prism 5, and passes through the sensor lens 6, and then the beam is detected by the optical detector 7.

Generally, in the conventional optical pickup apparatus, when a high density optical disc such as a Digital Video Disk (DVD) having a capacity greater than a Compact Disc (CD) is used, since the writing density is increased by 6~8 times over the CD type optical disc, the numerical aperture of the objective lens 4 should be about 0.6 for reproducing the data written into the disc.

In addition, as the thickness of the substrate of the optical disc is made thicker, the coma aberration is increased due to the tilt. Therefore, in order to prevent the above-described problems, the thickness of the substrate of the DVD is designed to be about 0.6 mm which is thinner than the CD type optical disc.

Here, in the DVD, the data may be written onto both sides of the disc, and the writing surface thereof may be formed in double structure, for thus increasing the writing capacity of the disc.

In addition, since CD-dependent software having a large amount of the data has been developed, it is needed that the digital video disc player can reproduce the data written in the CD.

However, in the conventional optical pickup apparatus, when reproducing the high density disc such as DVD having a thickness of 0.6 mm and the optical disc such as CD having a thickness of 1.2 mm, the following problems occur.

Namely, in the case of the objective lens having a numerical aperture NA of 0.6 which is designed to focus a beam onto an optical disc D6 having a thickness of 0.6 mm, the beam strength distribution can be indicated by the full line as shown in FIG. 2.

However, when focusing the beam onto the optical disc D12 having a thickness of 1.2 mm by using the objective lens 4, the beam strength distribution can be indicated by the broken line due to the spherical aberration as shown in FIG. 2.

Namely, when focusing the beam on the optical disc D12 having a thickness of 1.2 mm by using the objective lens, the beam strength ratio of a main lobe is significantly decreased relative to the DVD having a thickness of 0.6 mm in accordance with the beam strength distribution, and the beam strength of a side lobe is relatively increased, so that the crosstalk from the signal written in neighboring tracks is increased.

For example, when reading the data written on the CD type optical disc having a thickness of 1.2 mm and a track pitch of 1.6 μm by using the objective lens having a numerical aperture NA of 0.6, the crosstalk value is less than −20 dB.

Finally, when using the objective lens 4 having a numerical aperture NA of 0.6 which is designed in order to optimally focus the beam onto the optical disc D6 having a thickness of 0.6 mm and using the optical disc having a thickness of 1.2 mm, the spherical aberration with respect to the optical disc is significantly increased.

Therefore, it is impossible to stably reproduce the data written on the CD type optical disc having a thickness of 1.2 mm and on the DVD type optical disc having a thickness of 0.6 mm.

In addition, the optical pickup apparatus using a hologram, as shown in FIGS. 3 and 4, is intended for reproducing different optical discs each having different writing densities and thicknesses by using the hologram having a circular grating.

However, the above-described optical pickup apparatus using the hologram has disadvantages in that when writing and reproducing the data written on the DVD type optical disc, the optical power is distributed due to the diffraction of the hologram, for thus decreasing the efficiency of the apparatus.

SUMMARY OF THE INVENTION

Accordingly, it is an object of the present invention to provide an optical pickup apparatus for different discs which overcomes the aforementioned problems encountered in the conventional art.

It is another object of the present invention to provide an improved optical pickup apparatus for different discs which is capable of writing and reading a data onto discs having different writing densities and thicknesses by using one optical pickup apparatus and a liquid crystal deflector (LCD) or a Grating Polarizing Beam Splitter (GPBS).

It is another object of the present invention to provide an improved optical pickup apparatus for different disc which is capable of writing and reading a data onto discs having different writing densities and thicknesses by using one optical pickup apparatus and a liquid crystal deflector (LCD) which removes a desired portion of beams by using a phase grating based on an electro optical effect of a liquid crystal.

It is another object of the present invention to provide an improved optical pickup apparatus for different discs which is capable of writing and reading a data onto discs having different writing densities and thicknesses by maintaining a grating effect after an electric voltage is not supplied by using a liquid crystal shutter and a grating polarizing beam splitter.

It is another object of the present invention to provide an improved optical pickup apparatus for different discs which is capable of simplifying the construction of the optical pickup apparatus and reducing the fabrication cost.

To achieve the above objects, in accordance with a first embodiment of the present invention, there is provided an optical pickup apparatus for different discs which includes an objective lens for focusing a beam onto optical discs each having different thicknesses, and a numerical aperture control means for selectively passing through a beam in accordance with the thickness of the optical discs, diffracting a portion of the beam, and controlling the numerical aperture of the objective lens.

To achieve the above objects, in accordance with a second embodiment of the present invention, there is provided an optical pickup apparatus for different discs which includes an objective lens for focusing a beam onto optical discs each having different thicknesses, and a liquid crystal device having a co-central circular electrode pattern for diffracting the beam made incident onto the objective lens by selectively supplying an electric voltage in accordance with the kind of disc, and transmitting the beam by removing the electric voltage.

To achieve the above objects, in accordance with a third embodiment of the present invention, there is provided an optical pickup apparatus for different discs which includes a beam source for generating beams irradiated on the surface of an optical disc, a liquid crystal shutter arranged between the beam source and optic disc for selectively varying the polarizing direction of the beam to be made incident toward the optical disc in accordance with the kind of the optical disc, a grating polarizing beam splitter for blocking the beam from the liquid crystal shutter in accordance with the shape of a pattern and for generating a diffraction beam, and an objective lens for maintaining numerical apertures which are different from the diffraction beams and for accurately focusing beam on the surfaces of different optical discs.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
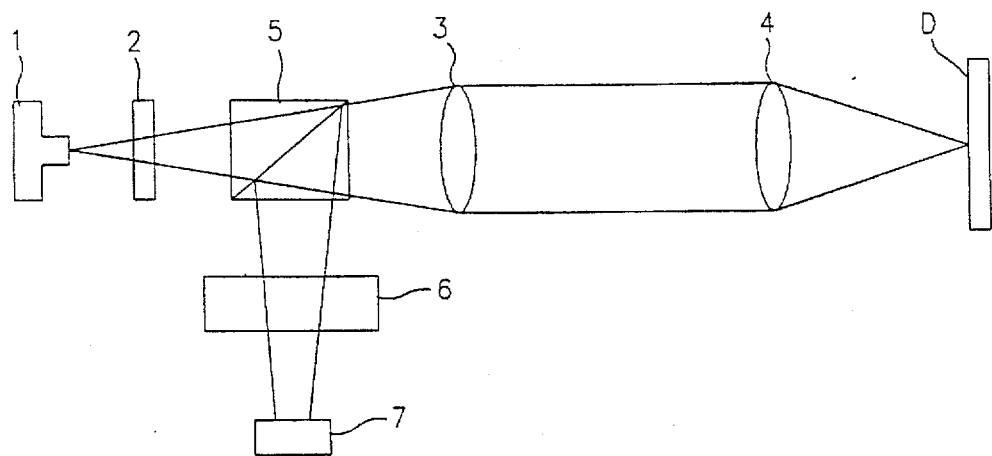
FIG. 1 is a view illustrating the construction of a conventional optical pickup apparatus.
Figure 2:
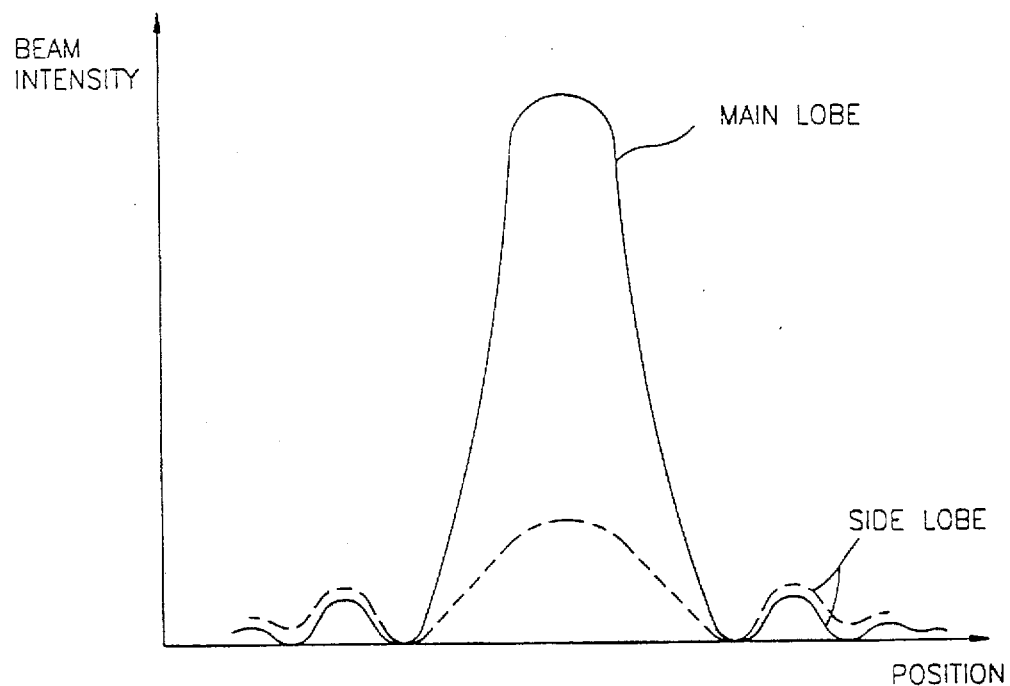
FIG. 2 is a graph illustrating a beam strength distribution with respect to different optical discs having different thicknesses in the conventional art.
Figure 3:
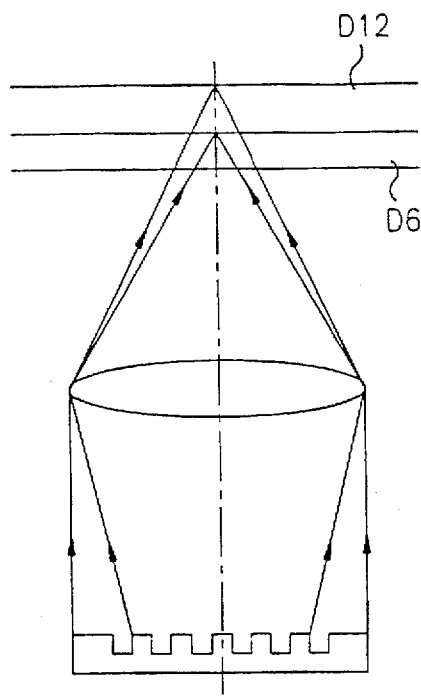
FIG. 3 is a view illustrating an optical diffraction state of a conventional optical pickup apparatus using a hologram.
Figure 4:
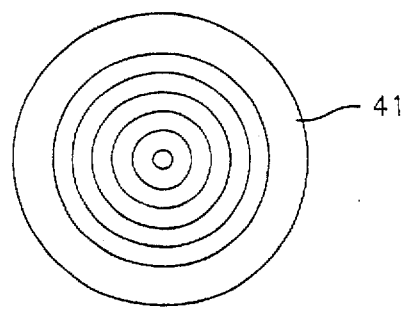
FIG. 4 is a plan view illustrating a hologram of an optical pickup apparatus of FIG. 3.
Figure 5:
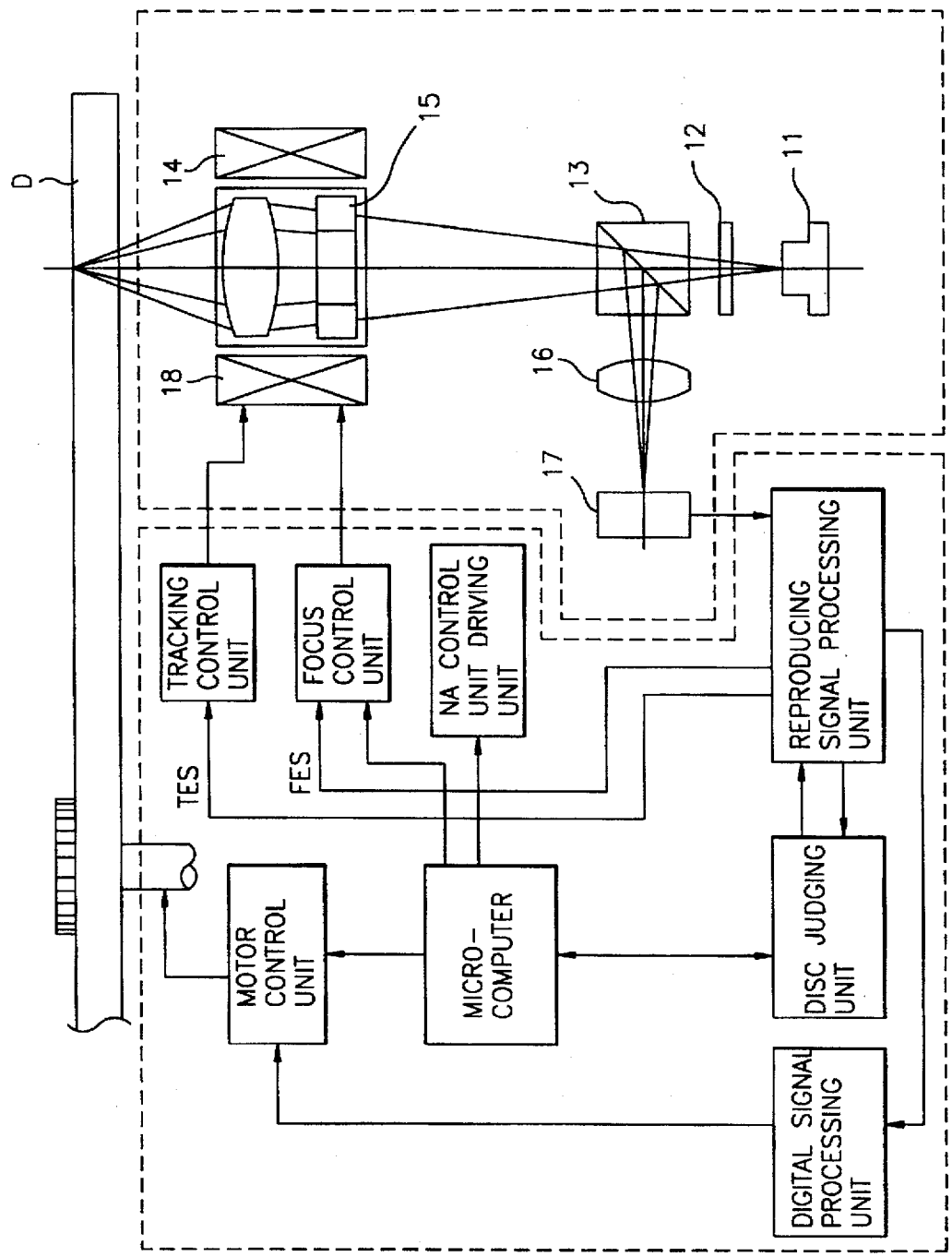
FIG. 5 is a block diagram illustrating an optical system of an optical pickup apparatus for different discs according to the present invention.
Figure 6:
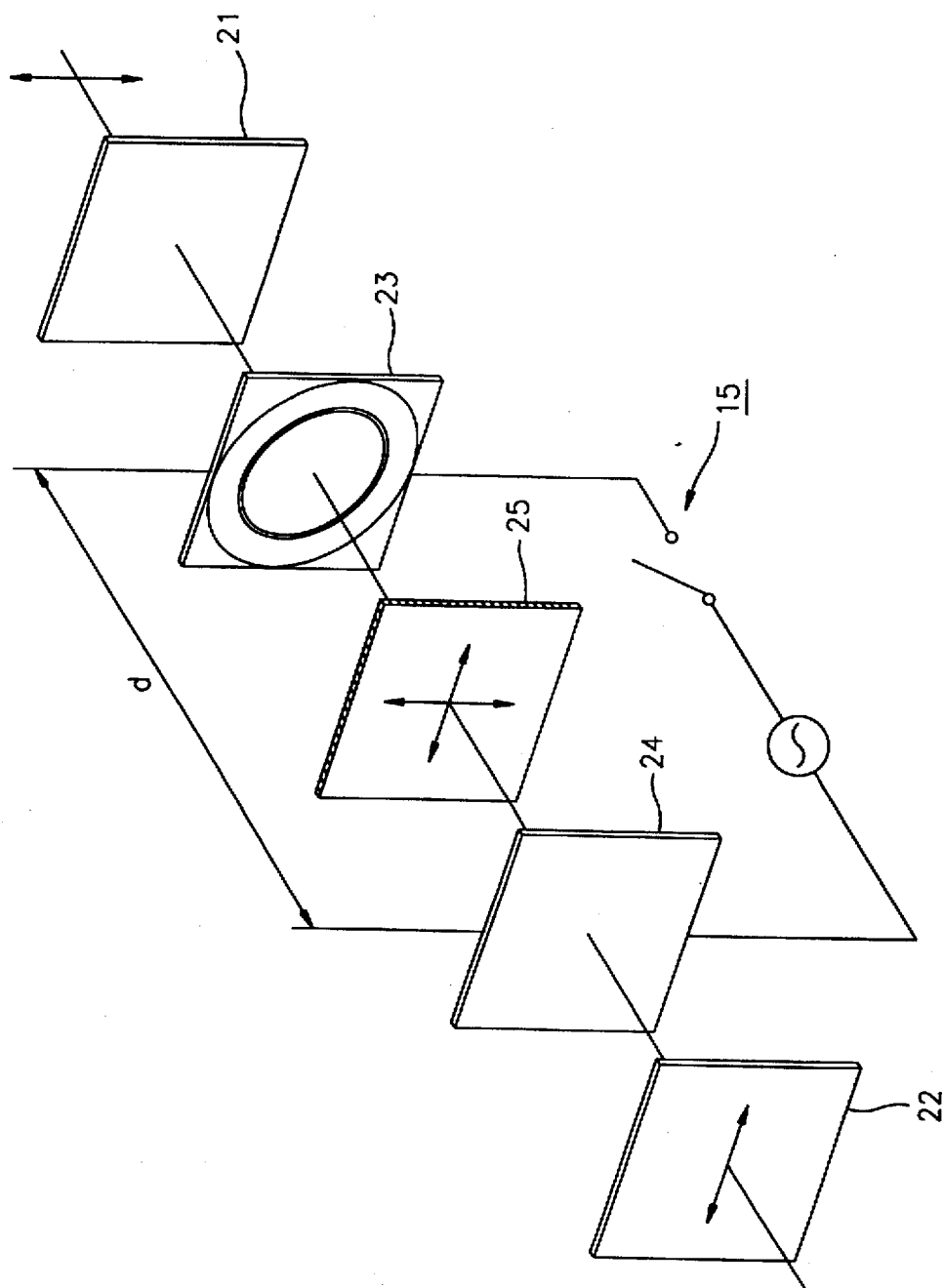
FIG. 6 is an exploded perspective view illustrating a liquid crystal deflector of an optical pickup apparatus for different discs according to the present invention.

FIG. 5 is a block diagram illustrating an optical system of an optical pickup apparatus for different discs according to the present invention, and FIG. 6 is an exploded perspective view illustrating a liquid crystal deflector of an optical pickup apparatus for different discs according to the present invention.

As shown therein, a grating 12 is arranged beside a laser diode 11 irradiating laser beams for generating a main beam and two sub-beams for a tracking servo.

In addition, a beam splitter 13 is arranged beside the grating 12 for transmitting a part of beams from the grating 12 and for reflecting a part thereof.

A diffraction member 15 is arranged beside the beam splitter 13 for controlling the amount of the beam from the beam splitter 13 and advancing the beam toward an objective lens 14 (which will be described later), for thus controlling the effective numerical aperture of the objective lens 14.

In addition, the objective lens 14 is arranged beside the diffraction member 15 for focusing the beam from the diffraction member 15 onto an optical disc "D".

A sensor lens 16 is arranged beside the beam splitter 13 for condensing the beam reflected by the optical disc "D" and reflected by the beam splitter 13, and an optical detector 17 is arranged beside the sensor lens 16 for detecting the data signal corresponding to the beam from the sensor lens 16.

Here, the diffraction member 15 for controlling the numerical aperture is a Liquid Crystal Deflector (LCD) for removing a part of beams and is used as a phase grating by using an electro-optic effect when supplying electric voltage.

In the drawings, numeral 18 denotes an actuator driving unit.

The construction of a liquid crystal deflector which is the diffraction member will now be explained in more detail.

The liquid crystal deflector LCD, as shown in FIG. 6, includes a two-plate type lower transparent substrate 21 and an upper transparent substrate 22, and two electrodes 23 and 24 each having a predetermined pattern which is used as a phase grating in cooperation with the electro-optic effect when electric voltage is supplied thereto.

Among the electrodes 23 and 24 arranged in the lower and upper transparent substrates 21 and 22, a portion thereof is patterned as a common electrode. In addition, a plurality of electrodes are formed with a pattern having a predetermined period.

The electrodes 23 and 24 are driven by the same driving source.

As shown in FIG. 5, the beam from the laser diode 11 passes through the beam splitter 13, and the beam from the beam splitter passes through the liquid crystal deflector LCD which is the diffraction member as the numerical aperture control member, for thus controlling the amount of the beam, and then the beam is focused onto the optical disc "D" by the objective lens 14.

Thereafter, the beam reflected by the optical disc "D" passes through the objective lens 14 and the liquid crystal deflector LCD, and is reflected by the beam splitter 13, and advances toward the optical detector 17 through the sensor lens 16.

The reproducing operation of the CD type optical disc D12 and the DVD type optical disc D6 by the liquid crystal deflector LCD will now be explained in more detail.

First, the principle of the liquid crystal deflector LCD will now be explained.

When an electric field is applied to a liquid crystal layer 25 having a predetermined direction, the deflection ratio "ne" with respect to the extra ordinary beam is varied.

Therefore, when patterning the electrodes 23 and 24 in the transparent substrates 21 and 22 by using the above-described characteristic in a desired shape, it is possible to vary the partial distribution of the deflection ratio in a desired shape, for thus fabricating a phase grating, namely, the phase hologram.

Here, in the first embodiment of the present invention, one of the electrodes 23 and 24 is patterned.

The upper and lower transparent substrates 21 and 22 and the electrodes 23 and 24 will now be explained in more detail.

Figure 7A:
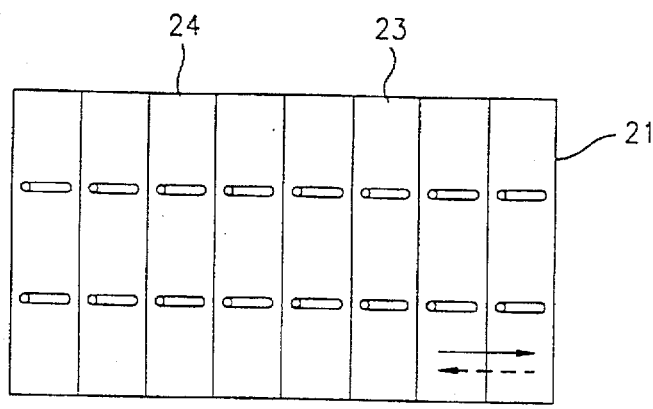
FIG. 7A is a plan view in order to explain the principle of a liquid crystal deflector of an optical pickup apparatus for different discs according to the present invention.
Figure 7B:
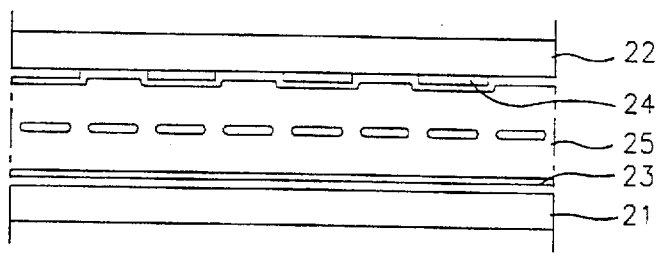
FIG. 7B is a side cross-sectional view illustrating in order to explain the principle of a liquid crystal deflector of an optical pickup apparatus for different discs according to the present invention.

The electrodes 23 and 24, as shown in FIGS. 7A and 7B, are formed in the upper surface of the lower transparent substrate 21 and the lower surface of the upper transparent substrate 22, and the liquid crystal layer 25 is formed between the electrodes 23 and 24.

Here, the lower electrode 23 is patterned as a common electrode, and the upper electrode 24 includes a pattern having a predetermined period. The liquid crystal of the liquid crystal layer 25 is perpendicular with respect to the electrodes 23 and 24.

Figure 8:
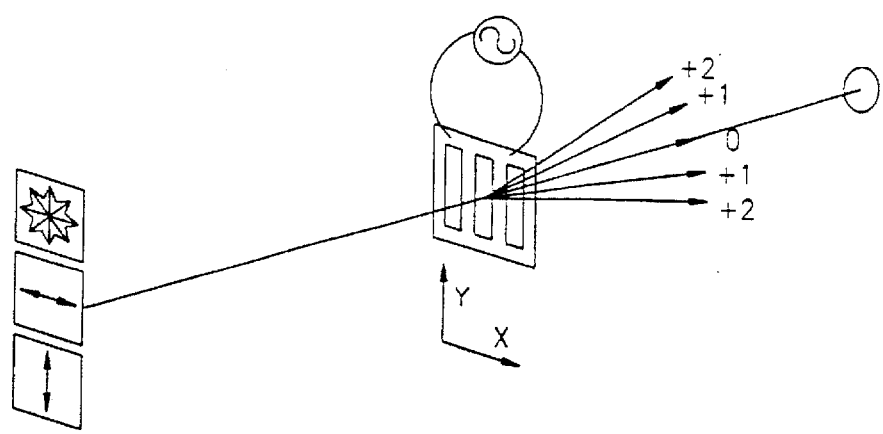
FIG. 8 is a perspective illustrating a state that a laser beam passes through a liquid crystal deflector as shown in FIGS. 7A and 7B.
Figure 9A:
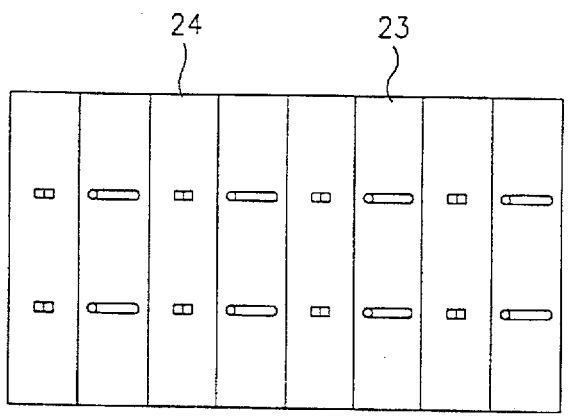
FIG. 9A is a plan view illustrating a state that an electric voltage is supplied to an electrode of a liquid crystal deflector as shown in FIGS. 7A and 7B.
Figure 9B:
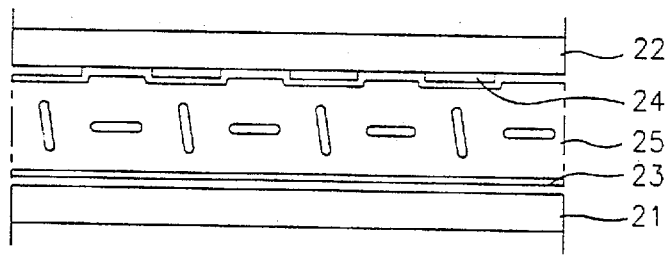
FIG. 9B is a side cross-sectional view illustrating a state that an electric voltage is supplied to an electrode of a liquid crystal deflector as shown in FIGS. 7A and 7B.

Therefore, as shown in FIGS. 8 and 9, when electric voltage is supplied to the electrodes 23 and 24, the beam passing through the liquid crystal deflector LCD is diffracted by the grating effects.

Here, on the assumption that the period of the electrodes 23 and 24 is $\Lambda$, and the wavelength is $\lambda$, the diffraction angle $\theta$ of a first diffraction beam can be expressed as follows.

$$\sin\theta = \lambda/\Lambda \quad (1)$$

In addition, when the deflection ratio is modulated to a sign wave form, the phase grating diffraction efficiency $\eta m$ (where m denotes the order of diffraction) can be expressed as follows:

$$\eta m(\Delta) = |Jm(\Delta)|^2 \quad (2)$$

where Jm(x) denotes a first class Bessel function, and the phase difference $\Delta$ can be expressed as follows:

$$\Delta = 2\pi/\lambda \cdot \Delta n \cdot d \quad (3)$$

where $\Delta n$ denotes a difference between an extra ordinary deflection ratio and a normal deflection ratio of the liquid crystal which is varied in accordance with the kind and type of the liquid crystal. Generally, the difference valve is 0.05~0.2.

In addition, "d" denotes the thickness of the liquid crystal 25, and can be controlled within a few μm~a few tens μm based on the implantation process of the liquid crystal.

Therefore, as described in the equations (1) and (3), the point that the efficiency of "0"th-order diffraction beam (a transmission wave) of the laser beam becomes 0 (zero) is when $Jo(\Delta) = 0$.

Therefore, when controlling the values $\Delta n$ and "d" in order for the value $\Delta$ to be 2.4, 5.8, 8.7 . . . , the beam is deflected to a high order diffraction beam without transmission waves.

Figure 10:
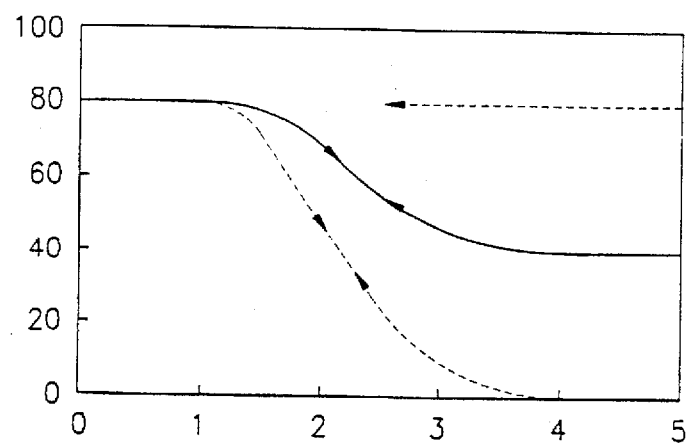
FIG. 10 is a graph illustrating a transmissivity of a liquid crystal deflector as shown in FIGS. 7A and 7B.

Since the variation of the deflection ratio is varied in the X-direction as shown in FIG. 10, the liquid crystal transmission ratio and voltage of the liquid crystal deflector as shown in FIGS. 7A and 7B exceeds a threshold value of the voltage supplied thereto when the polarizing of the incident laser beam is only performed in the X-direction. For example, when the voltage exceeds 4V, there is a characteristic which can plays a role of a shutter without the transmission wave.

Figure 11A:
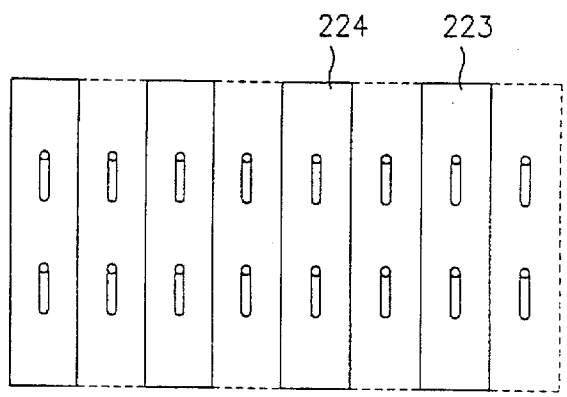
FIG. 11A is a plan view in order to explain the principle of a liquid crystal deflector of an optical pickup apparatus for different discs according to a second embodiment of the present invention.
Figure 11B:
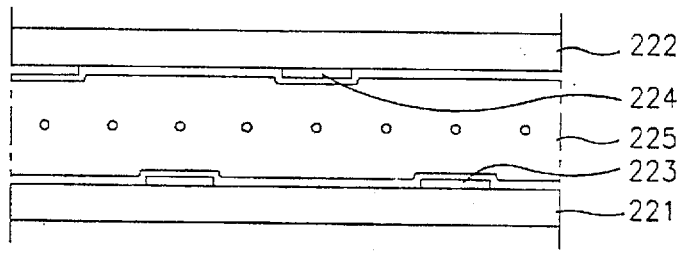
FIG. 11B is a side cross-sectional view in order to explain the principle of a liquid crystal deflector of an optical pickup apparatus for different discs according to a second embodiment of the present invention.

In addition, FIG. 11A is a plan view in order to explain the principle of a liquid crystal deflector of an optical pickup apparatus for different discs according to a second embodiment of the present invention, and FIG. 11B is a side cross-sectional view in order to explain the principle of a liquid crystal deflector of an optical pickup apparatus for different discs according to a second embodiment of the present invention.

As shown therein, a plurality of electrodes 223 are arranged on the upper surface of the lower transparent substrate 221, and a plurality of electrodes 224 are arranged on the lower surface of the transparent substrate 222. A liquid crystal layer 225 is formed therebetween.

The electrodes 223 and 224 formed in the lower transparent 221 and the upper transparent substrate 222 are intersectingly arranged, and the liquid crystal of the liquid crystal layer 225 is parallel with respect to the electrodes 223 and 224.

Figure 12A:
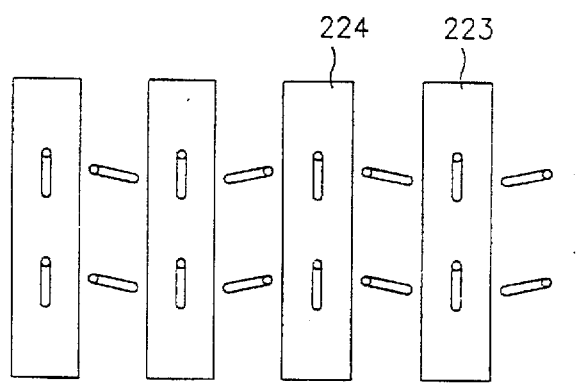
FIG. 12A is a plan view illustrating a state that an electric voltage is supplied to an electrode of a liquid crystal deflector as shown in FIGS. 11A and 11B.
Figure 12B:
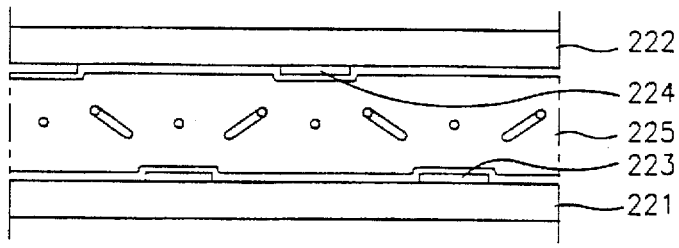
FIG. 12B is a side cross-sectional view illustrating a state that an electric voltage is supplied to an electrode of a liquid crystal deflector as shown in FIGS. 11A and 11B.

When an electric voltage is supplied to the electrodes 223 and 224 of the liquid crystal deflector LCD according to the second embodiment of the present invention, the deflection ratio, as shown in FIGS. 12A and 12B, is varied in the X-, and Y-directions due to the arrangement of the liquid crystal molecules (the phase modulation).

Figure 13:
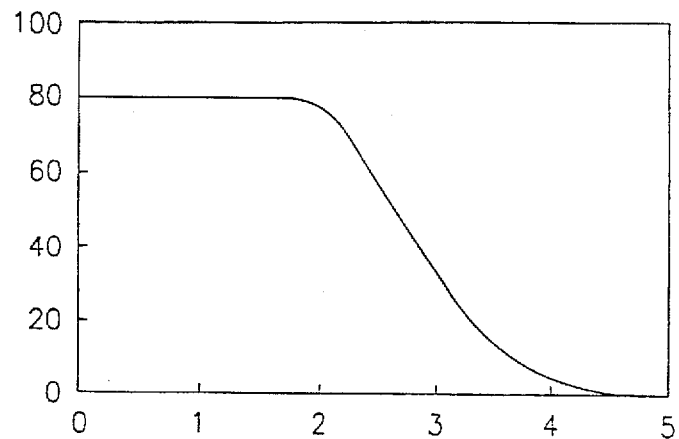
FIG. 13 is a graph illustrating a transmissivity of a liquid crystal deflector as shown in FIGS. 11A and 11B.

Therefore, as shown in FIG. 13, the shutter operation can be performed irrespective of the polarizing direction of the incident light.

Figure 14A:
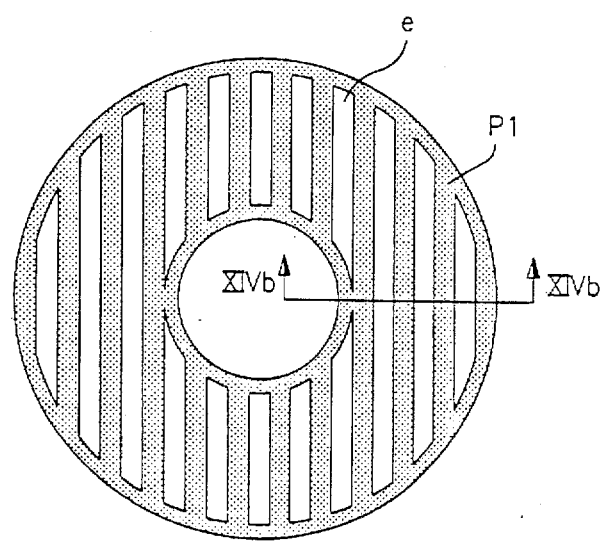
FIG. 14A is a plan view illustrating an electrode pattern of a liquid crystal deflector of an optical pickup apparatus according to the present invention.
Figure 14B:
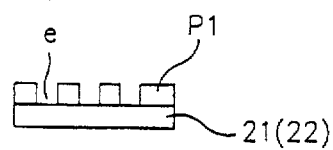
FIG. 14B is a plan view taken along line XIVb—XIVb of FIG. 14A.

The patterns of the electrodes 23, 23, 223, and 224 according the first and second embodiments of the present invention are an ITO film formed in the transparent substrates 21, 22, 221, and 222. In addition, as shown in FIGS. 14A and 14B, a stick-shaped pattern (pi) is formed by a plurality of stick-shaped etching portions (e). The patterns (p1) are integrally formed.

Figure 15A:
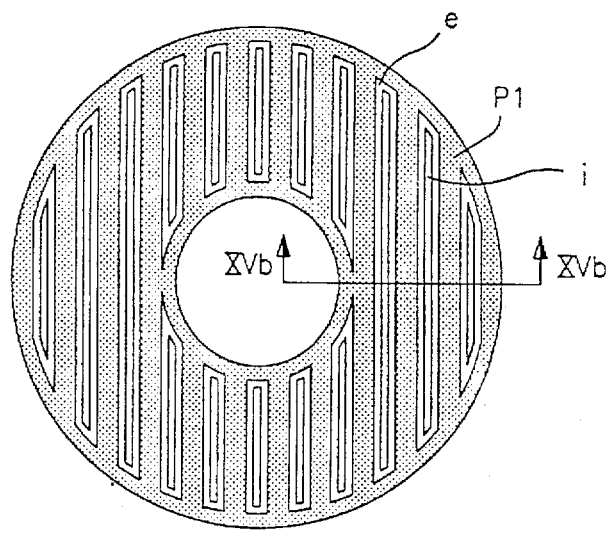
FIG. 15A is a plan view illustrating another electrode pattern formed in a liquid crystal deflector a shown in FIGS. 14A and 14B.
Figure 15B:
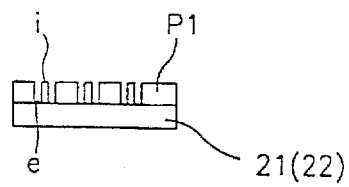
FIG. 15B is a cross-sectional view taken along line XVb—XVb of FIG. 15A.

FIG. 15A is a plan view illustrating another electrode pattern formed in a liquid crystal deflector a shown in FIGS. 14A and 14B, and FIG. 15B is a cross-sectional view taken along line XVb—XVb of FIG. 15A.

As shown therein, a residual ITO film (i) which is spaced apart from the pattern (p1) is formed in an intermediate portion of the etching portion (e) as shown in FIGS. 14A and 14B, so that it is possible to reduce a noise which may occur if the area of the etching portion (e) is large.

Here, the electric voltage is not supplied to the residual ITO film (i).

Namely, the residual ITO film (i) is not additionally formed in the etching portion (e). In a state that the residual ITO film (i) remains, a predetermined portion thereof is etched, for thus separately forming the pattern (p1) and the current ITO film (i) by the etching portion (e).

Figure 16:
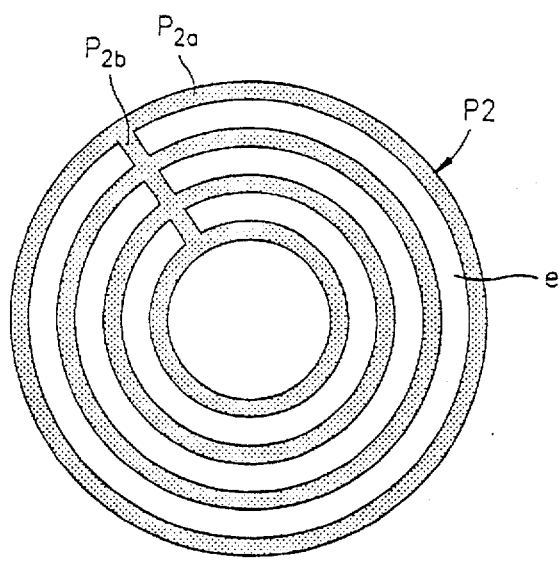
FIG. 16 is a plan view illustrating an electrode pattern formed in a liquid crystal deflector of an optical pickup apparatus according to the present invention.

In addition, FIG. 16 is a plan view illustrating an electrode pattern formed in a liquid crystal deflector of an optical pickup apparatus according to the present invention. There are shown other patterns formed in the electrodes 23, 24, 223, and 224.

There are formed a plurality of co-central or concentric circular portions (p2a) formed by the etching portion (e), and a plurality of connection portions (p2b) connecting the co-central circular portions (p2a), for thus integrally connecting the patterns (p2).

The pattern (p1) as shown in FIGS. 14A and 14B and 15A and 15B is called as a stick-shaped pattern, and the pattern (p2) as shown in FIG. 16 is called as a co-central circular pattern.

In the stick-shaped patterns (pi), the high order diffraction beam outgoes in the direction perpendicular with respect to the electrodes 23, 24, 223, and 224. The embodiments as shown in FIGS. 7A and 7B and 11A and 11B are adaptable thereto.

Namely, in the case of the embodiment as shown in FIGS. 7A and 7B, the pattern (p1) is formed in the lower transparent substrate 21, for thus forming an electrode 23, and in the case of the embodiment as shown in FIGS. 11a and 11B, the pattern (p1) is intersectingly formed in the lower transparent substrate 221 and the upper transparent substrate 222, for thus forming the electrodes 223 and 224.

In addition, in the co-central circular pattern (p2), since the high order diffraction beam radially outgoes, the embodiment as shown in FIGS. 11A and 11B is adaptable thereto.

Therefore, if the embodiment as shown in FIGS. 7A and 7B is adapted, only straightly polarizing beam which is perpendicular with respect to the electrodes 23 and 24 is used for the optical pickup apparatus. In addition, if the embodiment a shown in FIGS. 11A and 11B are adapted, the straightly polarizing beam as well as the circularly polarizing beam are available.

The operation of the optical pickup apparatus using the liquid crystal deflector to which the stick-shaped pattern (p1) will now be explained.

Figure 17:
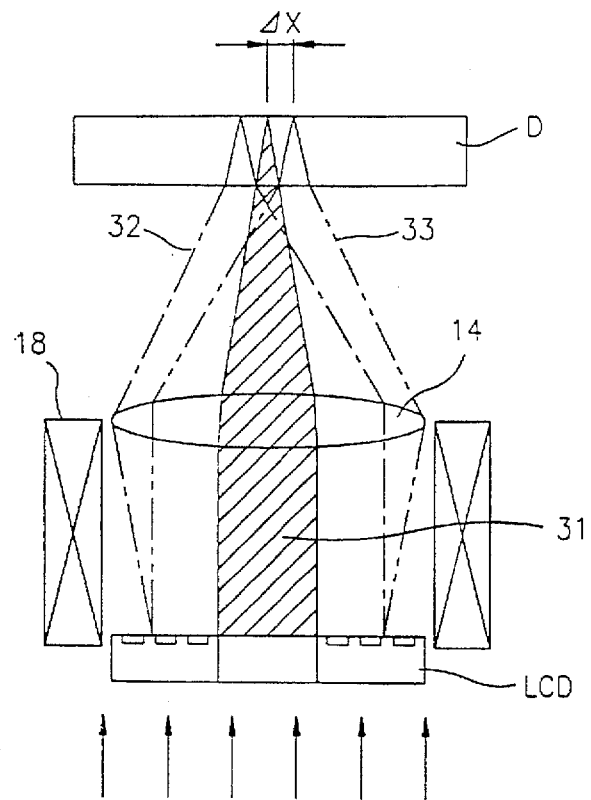
FIG. 17 is a view illustrating an optical diffraction state by a liquid crystal deflector of an optical pickup apparatus according to the present invention.

In FIG. 17, reference numeral 31 denotes a CD main beam, 32 denotes a −1st order diffraction beam of a peripheral beam, and 33 denotes a +1st order diffraction beam.

Figure 18:
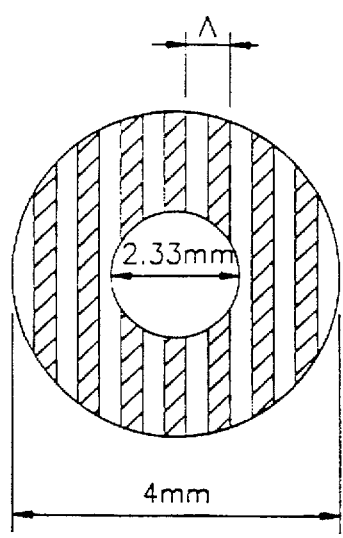
FIG. 18 is a plan view illustrating an electrode pattern formed in a liquid crystal display (LCD) as shown in FIG. 17.
Figure 19:
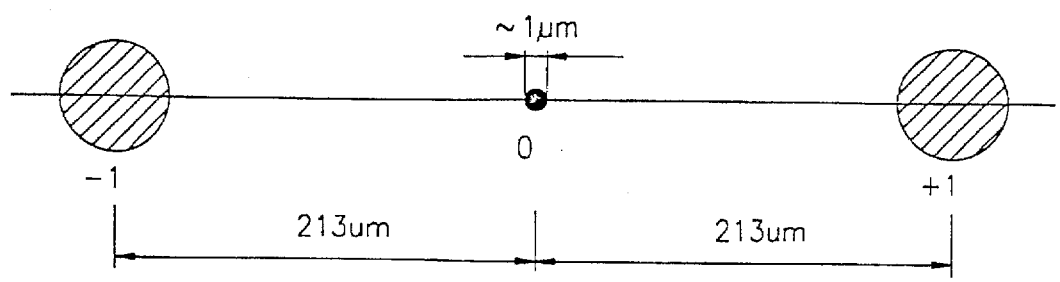
FIG. 19 is a view illustrating a beam spot based on an optical diffraction of a liquid crystal deflector as shown in FIG. 17.

As shown in FIG. 18, for example, if the diameters of the objective lens 14 and the liquid crystal deflector LCD are 4 mm, the inner diameter of the numerical aperture is 2.33 mm, the period $\Lambda$ of the electrode is 10 μm, the advancing angle of the ±1st order diffraction beam can be expressed as "$\theta=\sin^{-1}(0.65/10) =3.7°$" by the equation (1).

Therefore, since the distance between the focal surface of the optical disc "D" and the main beam of the ±1st beam is $\Delta x=f\_\tan(\theta)$, where f denotes a focal distance of the objective lens 14, when f=3.3 mm, the $\Delta x=213$ μm.

Therefore, the beam is focused on the surface of the optical disc "D" away from the optical disc "D" by a few μm (about 7 μm). The focusing spot on the surface of the optical disc "D", as shown in FIG. 10, formed away by more than a few hundreds μm (about 213 μm).

Therefore, it is possible to control the numerical aperture of the objective lens 14 by deflecting the beam to a ±1st and higher order diffraction beams by using the liquid crystal deflector, so that it is possible to write and reproduce the data from different optical discs D12 and D6 each having different writing densities and thicknesses.

Here, as the period $\Lambda$ of the electrode is increased, the valve $\Delta x$ is decreased, and as the period $\Lambda$ of the electrode is decreased, the valve $\Delta x$ is increased. Therefore, preferably, the period $\Lambda$ of the electrode is decreased within the effective range of the liquid crystal process.

In more detail, in the case of the above-described optical parameter, if the period $\Lambda$ of the electrode has a range of 1 μm<$\Lambda$<50 μm, it is possible to allow the ±1st order diffraction beam to be away from the main beam.

The diffraction of the ±1st order diffraction beam reflected by the optical disc "D" will now be explained.

The ±1st order diffraction beam reflected by the optical disc "D" advances toward the liquid crystal deflector LCD through the objective lens 14, for thus forming a diffraction.

Here, the beam which is diffracted at +1st order is diffracted at −1st order, and the beam diffracted at −1st order is diffracted at ±1st order.

Due to the above-described diffractions, there is a beam component which returns to the optical detector 17 in the same direction as the 0-th order main beam, so that the above-described components cause noise.

Of course, since the ±1st order diffraction beam is reflected by the surface of the optical disc "D" away from the focal spot the beam reached the surface of the optical detector 17 does not serve as a noise causing component. However, in order to reduce a small amount of noises, there is a method below.

Figure 20:
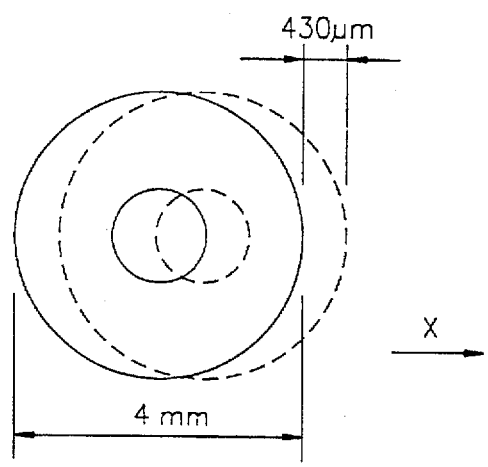
FIG. 20 is a view illustrating a state that a reflection beam is moved by a liquid crystal deflector of an optical pickup apparatus according to the present invention.

Namely, as shown in FIG. 20, if the period $\Lambda$ of the electrode is 10 μm, the diffraction angle $\theta$ is 3.7°. Therefore, the beam passes through the objective lens 14 having a focal distance of 3.3 mm and then is reflected by the surface of the optical disc "D". Thereafter, when the beam became the parallel beam, the position shift amount is $2\_f\_\tan(\theta)=430$ μm. In the drawings, the full line is a pattern of the incident beam, and the broken line which was shifted by 430 μm is a pattern of the outgoing beam when the beam returns toward the liquid crystal deflector LCD.

Figure 21:
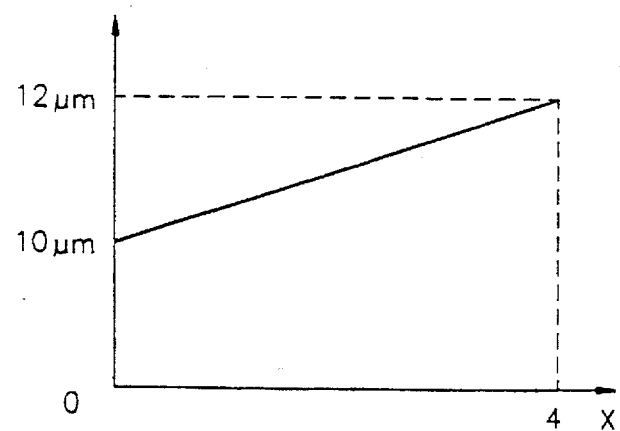
FIG. 21 is a graph illustrating a period variation of an electrode pattern based on the movement in the direction of an X-axis of an electrode pattern formed in a liquid crystal deflector according to another embodiment of the present invention.
Figure 22:
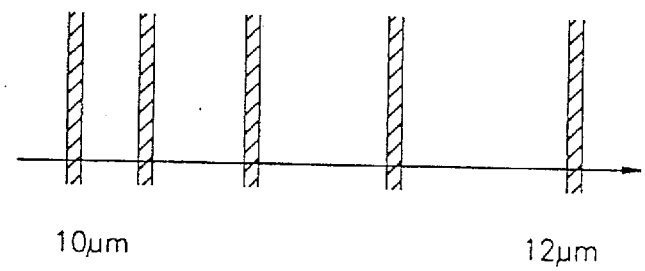
FIG. 22 is a plan view illustrating a period variation of an electrode pattern based on the movement in the direction of an X-axis of an electrode pattern formed in a liquid crystal deflector according to the present invention.
Figure 23:
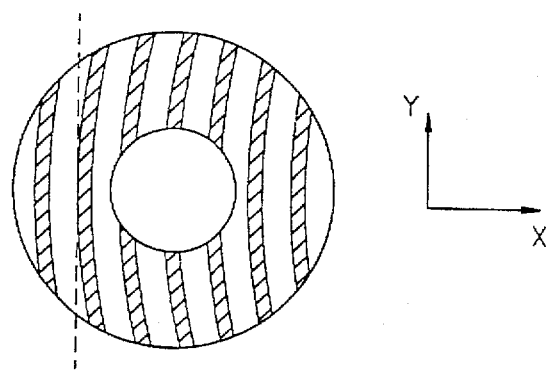
FIG. 23 is a plan view illustrating an electrode pattern formed in a liquid crystal deflector of an optical pickup apparatus according to another embodiment of the present invention.

Here, as shown in FIGS. 21 and 22, when chirping the pattern of the electrode period $\Lambda$ in the X-direction, since the diffraction angle of the ±1st diffraction beam is different in accordance with the position of the liquid crystal deflector LCD, the beam is more defocused by the surface of the optical disc "D", for thus reducing the noise components due to the beam reflected and returned thereto.

In addition, when the ±1st diffraction beam returns and is made incident onto the liquid crystal deflector LCD, the beam, as shown in FIG. 20, is shifted. The electrode period $\Lambda$ is made different at that point as shown in FIG. 22 and then is diffracted in another direction not in the direction of the 0-th order beam, so that the beam becomes away from the optical detector 17.

In addition, in another embodiment of the present invention, the electrode may be patterned in a Bessel form in the negative direction of the X-axis.

The operation of the optical pickup apparatus having the liquid crystal deflector LCD to which the co-central circular pattern (p2) is adapted will now be explained.

It is possible to obtain a desired effect of the liquid crystal deflector LCD irrespective of the deflection of the incident beam by intersectingly arranging the electrodes 223 and 224 by using the co-central circular patterns (p2). In this case, it is possible to reduce the noise by varying the period in the above-described method and deforming the shape thereof to an elliptical shape.

Figure 24:
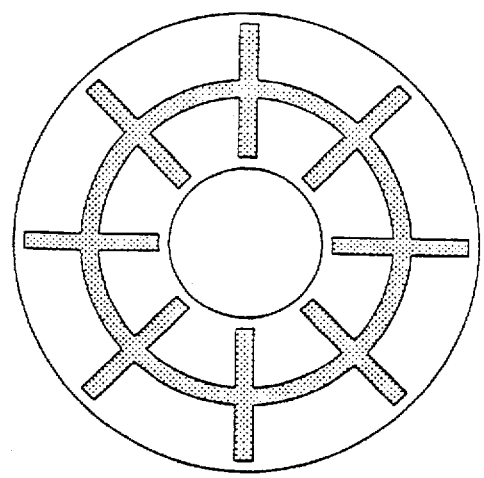
FIG. 24 is a plan view illustrating an electrode pattern formed in a liquid crystal deflector of an optical pickup apparatus according to another embodiment of the present invention.
Figure 25:
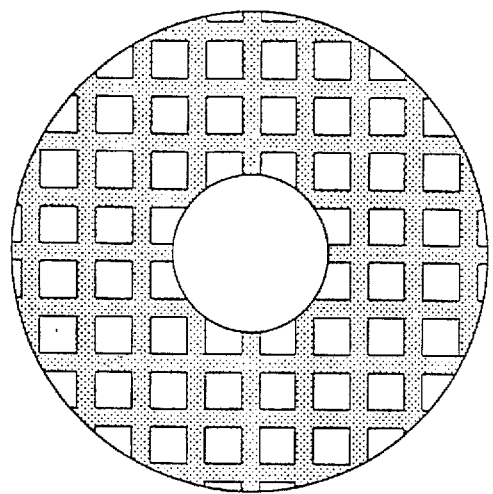
FIG. 25 is a plan view illustrating an electrode pattern formed in a liquid crystal deflector of an optical pickup apparatus according to another embodiment of the present invention.
Figure 26:
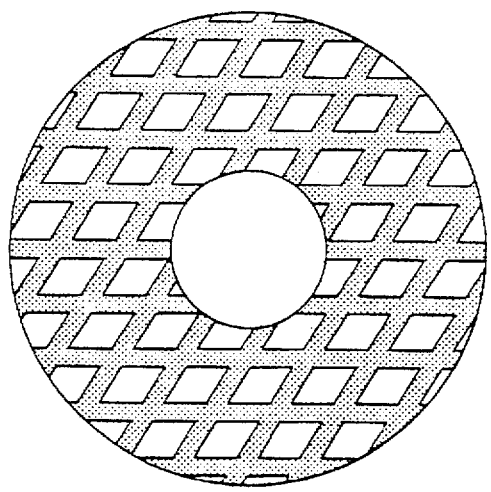
FIG. 26 is a plan view illustrating an electrode pattern formed in a liquid crystal deflector of an optical pickup apparatus according to another embodiment of the present invention.

In addition, it is possible to obtain the above-described purposes by preferably dispersing the beam by differently arranging the electrodes as shown in FIGS. 24 and 25.

In the third embodiment of the present invention, the liquid crystal LCD is adapted to the optical pickup apparatus using the hologram. The electrode patterns are formed identically with the patterns of the hologram.

The operation thereof will now be explained.

Figure 27A:
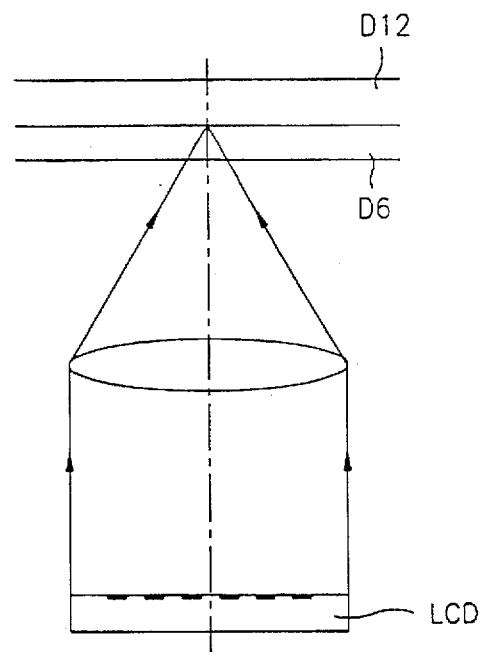
FIG. 27A is a view illustrating a state that an electric voltage is not supplied to the LCD of an optical pickup apparatus for different discs according to a third embodiment of the present invention.
Figure 27B:
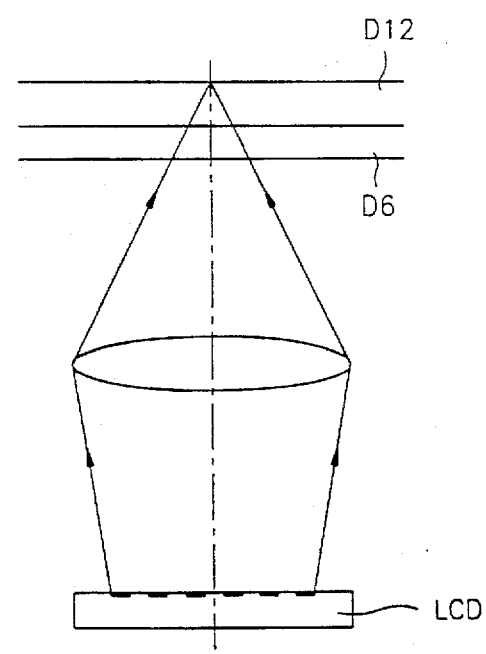
FIG. 27B is a view illustrating a state that an electric voltage is supplied to the LCD of an optical pickup apparatus for different discs according to a third embodiment of the present invention.

If the electric voltage is not supplied to the liquid crystal deflector, it is possible to write and reproduce the data from the DVD optical disc D6 as shown in FIG. 27A, and if the electric voltage is supplied to the liquid crystal deflector, it is possible to write and reproduce the data from the CD type optical disc D12 by using a +1st order diffraction beam as shown in FIG. 27B.

The optical pickup apparatus using the hologram according to the present invention is capable of using the beam strength 100% when using the DVD type optical disc, for thus increasing the optical efficiency of the system.

The optical pickup apparatus according to a fourth embodiment of the present invention will now be explained.

Figure 29:
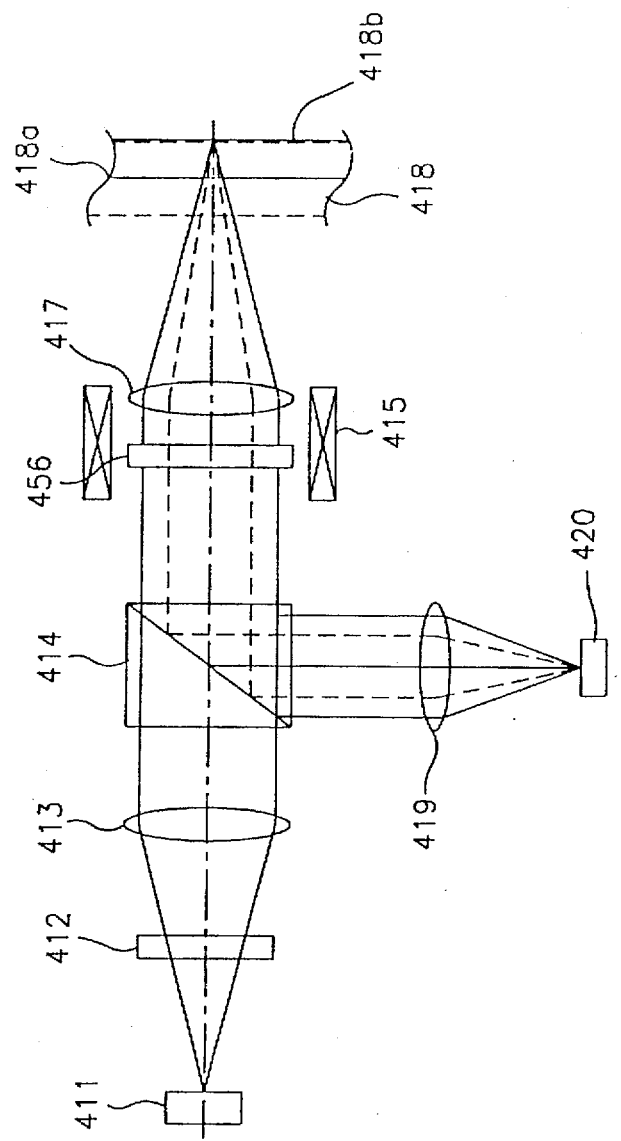
FIG. 29 is a view illustrating an optical pickup apparatus for different discs according to a fourth embodiment of the present invention.

As shown in FIG. 29, an LC shutter 412 is arranged beside a beam source 411 for irradiating beams toward an optical disc 418 for varying the deflection direction of the beam from the beam source 411 in accordance with the on/off operation of the electrodes.

In addition, a collimator lens 413 is arranged beside the LC shutter 412 for advancing the beam from the LC shutter 412 in a predetermined direction.

A beam splitter 414 is arranged beside the collimator lens 413 for distributing the incident beams, and an objective lens 417 is arranged beside the beam splitter 414 for focusing the beam from the beam splitter 414 onto a predetermined spot of the optical disc 418.

An optical detector 420 is arranged beside the beam splitter 414 for detecting the beam reflected by the surface of the optical disc 418 and transmitted through the beam splitter 414 and for converting the detected beam into an electrical signal.

A sensor lens 419 is arranged between the beam splitter 414 and the optical detector 420, a GPBS (Grating Polarizing Beam Splitter) 456 is arranged between the beam splitter 414 and the objective lens 417. An actuator 415 is arranged below and above the GPBS 456 and the objective lens 417 for horizontally and vertically shifting the objective lens 417.

Here, the collimator lens 413 serves to advance the parallel beam from the beam source 411 toward the beam splitter 414 through the LC shutter 412.

The beam splitter 414 transmits the beam from the collimator lens 413 toward the GPBS 456 and the objective lens 417, and the beam from the objective lens 417 is reflected thereby toward the sensor lens 419. The sensor lens 419 condenses the beam from the beam splitter 414 onto the surface of the optical detector 420.

In addition, the optical detector 420 converts the beam reflected by the data writing surfaces 418a and 418b of the optical disc 418 and transmitted thereto through the objective lens 417, the GPBS 456, the beam splitter 414, and the sensor lens 419 into an electrical signal.

The collimator lens 413 and the sensor lens 419 serves to constantly maintain the sensitivity of the reflected beam which is decreased in accordance with the horizontal and vertical movements of the objective lens 417 due to the focusing operation and tracking servo.

In addition, the LC shutter 412 changes the polarizing direction of the beam from the beam source 411 based on the kind of the optical disc (for example, the CD or DVD) in accordance with the electric power supply.

The GPBS 456 partially or fully transmits the beam from the LC shutter 412 through the collimator lens 413 and the beam splitter 414 toward the objective lens 417 in accordance with the polarizing direction and controls the amount of the beam made incident onto the objective lens 417.

The fabrication processes of the optical pickup apparatus for different discs will now be explained.

The fabrication method of the GPBS 456 of the optical pickup apparatus according to the present invention is disclosed in the article "Joint International Symposium on Optical Memory Storage, Jul. 8–12, 1996."

Figure 28A:
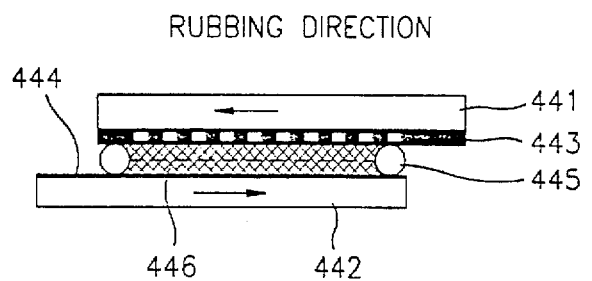
FIG. 28A is a side cross-sectional view in order to explain a fabrication process of a grating polarizing beam splitter used in an optical pickup apparatus for different discs according a fourth embodiment of the present invention.
Figure 28B:
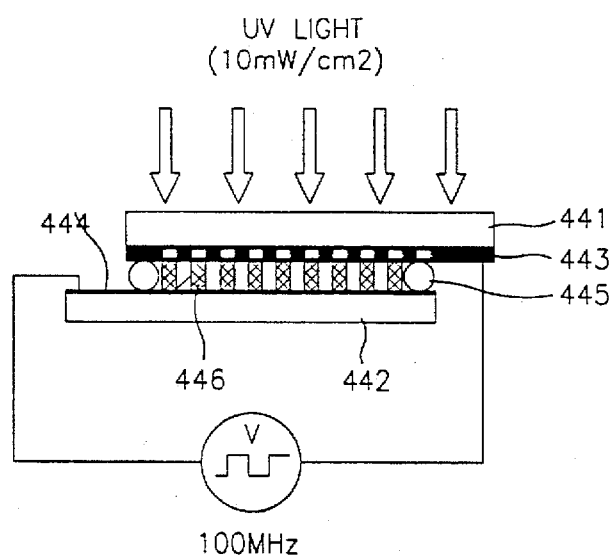
FIG. 28B is a side cross-sectional view illustrating a state that an ultra violet (UV) light is irradiated while an alternating current is applied to the apparatus as shown in FIG. 28A.
Figure 28C:
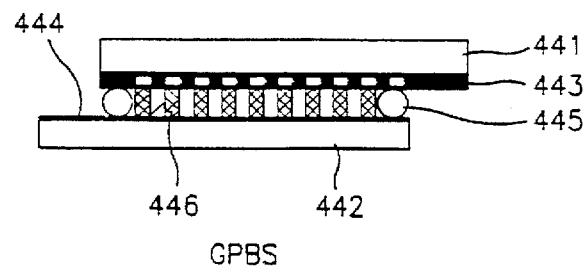
FIG. 28C is a side cross-sectional view illustrating a state that an electric voltage is not supplied to the apparatus as shown in FIG. 28B.

As shown in FIGS. 28A through 28C, an upper transparent electrode ITO 443, which is a stripe pattern, and an upper back-oriented film (not shown) are formed on the upper transparent substrate 441, and a rubbing process is performed with respect to the upper back-oriented film, for thus arranging the same in a predetermined direction.

In addition, a lower transparent electrode 444, which is a flat plate pattern, and a lower back-oriented film are formed on the lower transparent substrate 442. When rubbing the lower back-oriented film, the rubbing is performed in the reverse direction of the upper back-oriented film.

The upper and lower transparent substrates 441 and 442 are attached to each other by using an epoxy sealing material in order for the upper and lower back-oriented films to face each other with a predetermined distance between the upper and lower transparent substrates 441 and 442.

As shown in FIG. 28B, an alternating current having a square waveform is applied to the upper and lower electrodes 443 and 444 of the GPBS 456. When an ultra violet light having an energy intensity of 10 mW/cm² is irradiated thereto during the alternating current supply thereto, liquid crystal molecules 446 between the facing electrodes (between the upper transparent electrode 443 and the lower transparent electrode 444) are aligned parallel with respect to the electric field.

Namely, the grating is formed due to the periodic arrangement of the liquid crystal molecules 446, so that a predetermined variation occurs in the deflection ratio (phase modulation).

Here, since the periodic arrangement of the liquid crystal molecules 446 which are aligned in parallel is frozen by the optical polymerization, the grating characteristic, as shown in FIG. 28C, is not changed after the electric voltage is not supplied thereto.

In more detain, the UW curable liquid crystal molecules are combined at a predetermined ratio. Since the GPBS 456 is made of the above-described liquid crystal, when an ultra violet light is scanned thereto, the GPBS 456 becomes the polymer, so that the grating characteristic is maintained even when the electric voltage is removed therefrom.

In addition, since there is not a characteristic variation with respect to the temperature variation, it is possible to the GPBS 456 for the polarizing plate.

When the electrode is formed in a desired form in the transparent substrate, it is possible to change the spatial distribution of the deflection ratio in a desired form.

The electrode of the GPBS 456 includes a plurality of stick-shaped patterns by the stick-shaped etching portions like the electrode patterns of the LCD as shown in FIGS. 14A and 14B, so that it is possible to form the pattern p1 in integral shape.

Namely, in the pattern of the GPBS 456, the electrodes may be formed in a predetermined form such as a stick shape, a cocentral circular shape, etc., so that it is possible to disperse the light.

The operation of the optical pickup apparatus for different discs according to the fourth embodiment of the present invention, which is basically directed to controlling the numerical aperture of the objective lens 417 by diffracting the beam to ±1 and 0th order diffraction lights by using the GPBS, will now be explained with reference to the accompanying drawings.

The beam passing-through the GPBS 456 is divided in to a straightly advancing beam and a plurality of diffraction beams which are deflected by the diffraction.

Here, the straightly advancing beam is called as 0th beam, and the diffracting beams are called as +1st beam, +2nd order beam, . . . , in the order of smaller deflection angle. In addition, the beams which are reversely diffracted are called as −1st order beam, −2nd order beam, . . . , in the order of smaller deflection angle.

The objective lens 417 focuses the beam from the beam source onto the first and second data writing surfaces 418a and 418b of the optical disc 418 in the polarizing direction in accordance with the diffraction beam.

Here, the first data writing surface 418a is a data writing surface of the DVD, and the second data writing surface 418b is a data writing surface of the CD, and the second data writing surface 418b is arranged away from the surface of the optical disc 418 by 0.6 mm rather than the first data writing surface 418a.

Namely, the objective lens 417 has a numerical aperture of 0.35 by 0th order beam which was not diffracted by the GPBS 456, so that the beam is focused onto the second data writing surface 418b of the optical disc 418.

In addition, the objective lens 417 has a numerical aperture of 0.6 by 1st order beam which was diffracted in accordance with the electrode pattern of the GPBS 456, so that the beam is focused on the first data writing surface 418a of the optical disc 418.

In another embodiment of the present invention, the grating pattern as shown in FIG. 29 may be preferably formed in the anisotropic material such as $LiNbO_3$, not a liquid crystal liquid, and then may be used instead of the GPBS.

As described above, the optical pickup apparatus for different discs according to the present invention is basically directed to using a phase grating during the voltage supply by controlling the numerical aperture control member of the objective lens to which the liquid crystal deflector is adapted which removes a desired portion of the beam by using an electro optic effects of the liquid crystal, so that it is possible to write and read data from different discs each having different writing densities and thicknesses by using one unit.

In addition, it is possible to achieve the original purpose of the optical pickup apparatus adapting the liquid crystal shutter in the method of removing a desired portion of beams by using the liquid crystal as a phase grating, for thus reducing the fabrication cost of the system without using the expensive polarizing plate.

Furthermore, it is possible maintain the grating effects after the electric voltage is removed by using the GPBS without supplying electric voltage to the driving section of the actuator, for thus simplifying the construction of the driving section of the actuator, easily driving the system, and reducing the fabrication cost.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An optical pickup apparatus for different discs, comprising:
   an objective lens for focusing a beam onto optical discs each having different thicknesses; and
   numerical aperture control means, through which said beam is passed, for controlling the numerical aperture of the objective lens in accordance with a thickness of an optical disk, said numerical aperture control means including
   a lower transparent substrate,
   an upper transparent substrate,
   upper and lower patterned transparent electrodes formed on the lower transparent substrate and upper transparent substrate, respectively, for acting as a phase grating during an electric voltage supply thereto, and
   a body of liquid crystal arranged between said transparent electrodes;
   said upper transparent electrode having a first pattern defining a first non-zero period and said lower transparent electrode having a second pattern defining a second non-zero period.

2. The apparatus of claim 1, wherein said first period equals said second period and said first and second patterns are intersectingly formed with each other.

3. The apparatus of claim 2, wherein said patterns are formed into stick shapes by a plurality of stick-shaped etching portions and are integrally connected with each other.

4. The apparatus of claim 2, wherein a residual transparent electrode layer, which is separated by the patterns and to which an electric voltage is not supplied, is formed between the electrode patterns.

5. The apparatus of claim 2, wherein an interval period $\Lambda$ of the electrode patterns is 1 µm<$\Lambda$<50 µm.

6. The apparatus of claim 2, wherein periods of the electrode patterns are constantly varied in the X-direction in order to reduce the effects of the diffraction beam reflected by the optical disc.

7. The apparatus of claim 2, wherein said electrode patterns have predetermined curving ratios and are bent in one of the Y-axis direction and the negative direction on the X-axis in order to reduce the effects of the diffraction beam reflected by the optical disc.

8. The apparatus of claim 2, wherein said patterns include a plurality of co-central circular portions formed by a plurality of co-central circular etching portions wherein said co-central circular portions are integrally connected by a plurality of connection portions.

9. The apparatus of claim 1, wherein a hologram is formed in the upper and lower transparent electrodes, respectively.

10. An optical pickup apparatus for different discs, comprising:
    an objective lens for focusing a beam onto optical discs each having different thicknesses; and
    a liquid crystal diffraction device, located in a path of the beam ahead of said objective lens, the device having an electrode pattern formed of concentric circular portions for diffracting the beam in response to energization of said electrode pattern by an electric voltage in accordance with the thickness of the disc, and for transmitting the beam by removing the electric voltage.

11. An optical pickup apparatus for different discs, comprising:
    a beam source for generating beams irradiated on the surface of an optical disc;
    a liquid crystal shutter arranged between the beam source and said optical disc for selectively varying the polarizing direction of the beam to be made incident toward the optical disc in accordance with a thickness of the optical disc;
    a grating polarizing beam splitter GPBS for selectively transmitting all or part of the beam from the liquid crystal shutter and for generating a diffraction beam; and
    an objective lens for focusing the beam from said GPBS on the surfaces of different optical disc;
    said grating polarizing beam splitter including
    upper and lower transparent substrates,
    first and second transparent electrodes formed between the upper and lower transparent substrates, and
    a body of liquid crystal arranged between the first and second transparent electrodes for varying the deflection characteristic of beams in accordance with an electric filed,
    said upper transparent electrode having a first pattern defining a first non-zero period and said lower transparent electrode having a second pattern defining a second non-zero period.

12. The apparatus of claim 11, wherein molecules of said liquid crystal are arranged parallel with respect to an electric field when an alternating current and ultra violet light are applied to the first and second transparent electrodes.

13. The apparatus of claim 12, wherein said grating polarizing beam splitter has a grating characteristic which is not changed after the electric voltage is not supplied thereto.

14. The apparatus of claim 11, wherein the patterns of said grating polarizing beam splitter are formed in stick-shape by a plurality of stick-shaped etching portions and are integrally formed with each other.

15. The apparatus of claim 11, wherein said grating-shaped patterns are formed in an anisotropic material such as LiNbO$_3$.

16. The apparatus of claim 1, wherein at least one of said first and second patterns is formed as a grid from a first set of parallel lines intersecting with a second set of parallel lines.

17. The apparatus of claim 16, wherein said first set of parallel lines is perpendicular to said second set.

18. An optical pickup apparatus for different discs, comprising:

an objective lens for focusing a beam onto one of a plurality of optical discs of different thicknesses; and a liquid crystal diffraction device, located in a path of said beam ahead of said objective lens, said device having an electrode patterned as an annulus having intersecting radial line segments for diffracting the beam in response to energization of said electrode by an electric voltage in accordance with the thickness of the disc, and for transmitting the beam undiffracted when said electrode is not energized.

* * * * *